United States Patent Office 3,592,824
Patented July 13, 1971

3,592,824
3-SUBSTITUTED AMINO-1,2,3,4-TETRAHYDRO-CARBAZOLES
Robert Norman Schut, Edwardsburg, Mich., assignor to Miles Laboratories, Inc., Elkhart, Ind.
No Drawing. Continuation-in-part of application Ser. No. 670,409, Sept. 25, 1967, which is a continuation-in-part of application Ser. No. 623,244, Mar. 15, 1967, which in turn is a continuation-in-part of application Ser. No. 537,293, Mar. 25, 1966. This application Mar. 12, 1970, Ser. No. 19,084
Int. Cl. C07d 27/68
U.S. Cl. 260—315      2 Claims

ABSTRACT OF THE DISCLOSURE

A series of 3-substituted amino-1,2,3,4-tetrahydrocarbazoles in which at least one of the substituents is an alkynyl radical, which may also be substituted in the 6- or 9-positions, useful as analgetic agents.

BACKGROUND OF THE INVENTION

This application is a continuation-in-part of my copending application Ser. No. 670,409, filed Sept. 25, 1967 and now abandoned, which is a continuation-in-part of my copending application Ser. No. 623,244, filed Mar. 15, 1967, now abandoned, which is a continuation-in-part of copending application Ser. No. 537,293, filed Mar. 25, 1966, now abandoned.

This invention relates to carbazole derivatives. In one of its more particular aspects this invention relates to a series of 3-substituted amino-1,2,3,4-tetrahydrocarbazoles which have pharmacological properties that are beneficial.

SUMMARY OF THE INVENTION

The compounds of this invention may be represented by means of the structural formula:

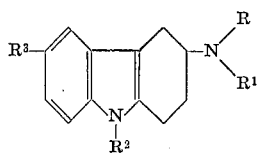

in which

is a member selected from the group consisting of

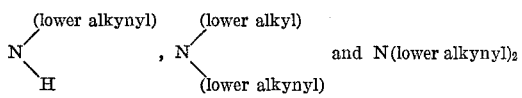

$R^2$ is a member selected from the group consisting of H and lower alkyl and $R^3$ is a member selected from the group consisting of H, OH and lower alkoxy, and acid addition salts thereof.

These compounds are conveniently prepared by means of the Fischer indole synthesis utilizing the appropriate phenylhydrazine and ketone to form the phenylhydrazone precursor which upon ring closure in the presence of acid or by thermal means results in the desired carbazole derivative. The reactions involved in the synthesis of the compounds of this invention can be illustrated by means of the following reaction sequence:

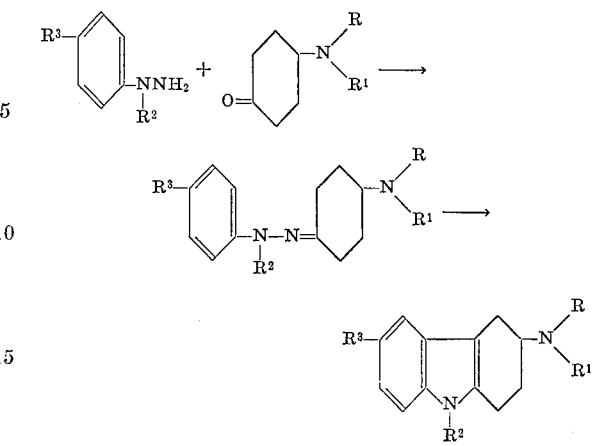

in which R, $R^1$, $R^2$, and $R^3$ have the meaning ascribed above.

The acid cyclizing agent may be any of the common inorganic hydrohalides such as HCl, HBr or HI or any of the common mineral acids such as $H_2SO_4$ or $H_3PO_4$, an organic acid such as acetic acid or a Lewis acid such as $BF_3$ or $ZnCl_2$.

When R or $R^1$ is H a 3-(secondary amino)-1,2,3,4-tetrahydrocarbazole is produced in the Fischer indole synthesis. Conversion to the 3-(alkynylamino)-1,2,3,4-tetrahydrocarbazoles of this invention is readily accomplished by alkylation thereof using the appropriate alkynyl halide. Conditions for this conversion are standard and generally include reacting the 3-(secondary amino) 1,2,3,4-tetrahydrocarbazole with the alkynyl halide in a suitable solvent such as a lower aliphatic alcohol at the reflux temperature of the solvent.

The resulting 3-substituted amino-1,2,3,4-tetrahydrocarbazoles can be supplied in the form of any desired salt such as the hydrochloride, hydrobromide, maleate or oxalate and the like. Although pharmacologically acceptable salts are preferred, other salts which may be of a toxic nature may have utility, for example, in separating the desired compound from mixtures in which it is present and for other uses than pharmacological ones.

When in the form of a pharmacologically acceptable acid addition salt, the compounds of this invention are useful as analgetic agents.

Medications may be prepared by mixing, as an active ingredient, one or more of the novel compounds of this invention in the form of a free base or a pharmacologically acceptable acid addition salt in unit dosage form with suitable fillers, carriers, extenders, excipients and the like generally used in preparing pharmaceutical formulations. The medication may be either in solid or liquid form and may be compounded as tablets, powders, capsules, suspensions and similar dosage forms according to accepted manufacturing methods. The unit dosage selected preferably permits an advantageous variation in the amount of active ingredient administered. These medications may be administered orally, intraperitoneally, subcutaneously, and in similar modes in conformity with recognized pharmacological techniques.

Medications including at least one compound of this invention as an active ingredient were administered to a test group of mice and analgetic activity was observed. The analgetic activity was evaluated substantially according to the procedure described by Bianchi, C., and Frenceschini, J., in "Experimental Observations on Haffner's Method for Testing Analgesic Drugs," Brit. J. Pharmacol., 9, 280 (1954). For the compound of Example 7

3 - (N-methyl-N-propargylamino)-1,2,3,4-tetrahydrocarbazole an $ED_{50}$ of 31.8 mg./kg. was observed upon intraperitoneal administration.

DESCRIPTION OF THE PREFERRED EMBODIMENTS

Example 1.—3-methylamino-1,2,3,4-tetrahydrocarbazole (A) 4-methylaminocyclohexanol.—A 230 g. sample of p-methylaminophenol sulfate was dissolved in 800 ml. aqueous methanol (1:3). Hydrogenation was carried out at 100° and 1500 p.s.i. using 1.0 g. of ruthenium dioxide as catalyst. The hydrogenation was complete in ca. 2 hours. The catalyst was removed by filtration and most of the solvent was distilled in vacuo. Twenty percent (20%) sodium hydroxide solution (200 ml.) was added to the residual syrup and the resulting solution was subjected to continuous extraction with $CHCl_3$ for one day. The extract was dried and concentrated and the residue distilled in vacuo to yield 123 g. of product, B.P. 105°–110° (5 mm.). The material was poured into anhydrous ether to form white crystals (108 g.), M.P. 78°–79°. In another run, the M.P. was 88°–89°. This change in melting point may be due to varying amounts of cis and trans isomers.

Analysis.—Calcd. for $C_7H_{15}NO$ (percent): N, 10.85. Found (percent): N, 10.59.

(B) 4-methylaminocyclohexanone.—To a mixture of 12.9 g. (0.10 mole) of 4-methylaminocyclohexanol and 33 g. of potassium t-butoxide in 300 ml. of dry benzene was added a solution of 90 g. of benzophenone in 200 ml. of benzene. The mixture was stirred at room temperature under a nitrogen atmosphere for three days. Water (200 ml.) was then added and the mixture was stirred vigorously for several minutes. The benzene layer was extracted with four 100 ml. portions of 10% HCl. The combined aqueous solutions were then counter-extracted with ether. After concentration (in vacuo) of the aqueous solution to ca. half-volume, solid potassium carbonate was added to release the free base. The solution was continuously extracted wtih $CHCl_3$ for one day. Drying and concentration of the extract at atmospheric pressure followed by vacuum distillation gave 5.09 g. of colorless liquid, B.P. 105°–110° (15 mm.);

$\nu_{max.}^{CHCl_3}$ 1715 cm.$^{-1}$.

(C) 3-methylamino - 1,2,3,4 - tetrahydrocarbazole.—A solution of 15.4 g. (0.121 mole) of 4-methylaminocyclohexanone and 13.5 g. (0.125 mole) of phenylhydrazine in 200 ml. of benzene containing 0.1 g. of p-toluenesulfonic acid was heated under reflux for 2 hours while collecting the liberated water in a Dean-Starke trap. After concentration of the benzene the phenylhydrazone syrup (24.7 g.) was dissolved in 300 ml. of acetic acid and the solution was heated at 90°–95° for three hours. The acetic acid was distilled in vacuo and the residue stirred with dilute NaOH solution. Extraction with $CHCl_3$, drying and concentration in vacuo gave 20.1 g. of greasy solid, M.P. 125°–129°. For analysis a sample was recrystallized from benzene-ether (charcoal treatment); M.P. 134°–135°, $\nu_{max.}^{CHCl_3}$ 3480 (indole N—H), 3410 (w., $CH_3NH$—), spikes at 1630 and 1600 cm.$^{-1}$;

$\lambda_{max.}^{MeOH}$ 226 m$\mu$ ($\epsilon$ 18,500) and 280 m$\mu$ ($\epsilon$ 5460).

Analysis.—Calcd. for $C_{13}H_{16}N_2$ (percent): C, 78.00; H, 8.05; N, 14.00. Found (percent): C, 77.48; H, 8.18; N, 13.96.

Example 2.—3-methylamino-1,2,3,4-tetrahydrocarbazole (A) 4-acetamidocyclohexanol.—A 390 g. sample (2.62 moles) of acetyl-p-aminophenol was reduced in a 2 liters autoclave at 100°, 1500 p.s.i. using methanol as solvent and 2 g. ruthenium dioxide as catalyst. The reduction was complete in eight hours. The catalyst was removed by filtration and the filtrate concentrated in vacuo. The residue was stirred with 1 liter of cold acetone to give 348 g. (86%) of off-color white solid, M.P. 135°–137°.

Analysis.—Calcd. for $C_8H_{15}NO_2$ (percent): C, 61.12; H, 9.62; N, 8.91. Found (percent): C, 61.32; H, 9.75; N, 8.90.

(B) 4-acetamidocyclohexanone.—To a cold stirred solution of 685 g. of sodium dichromate in 225 g. of concentrated sulfuric acid and 1.5 liter of water was added a solution of 180 g. (1.15 moles) of 4-acetamidocyclohexanol in 300 ml. of water. The solution was kept below 10° during the one hour addition period. The mixture was stirred and cooled an additional two hours. The reaction mixture was then extracted with chloroform for two days in a continuous liquid extractor. The organic phase was dried over $MgSO_4$, then concentrated in vacuo to give solid material of M.P. 136°–137° (yield 119 g., 69%). In another run an analytical sample had M.P. 126°–128°. The infrared spectra of the 2 samples were identical and there was no melting point depression on admixture.

Analysis.—Calcd. for $C_8H_{13}NO_2$ (percent): C, 61.91; H, 8.44; N, 9.04. Found (percent): C, 61.51; H, 8.56; N, 8.79.

(C) 3-acetamido-1,2,3,4-tetrahydrocarbazole.—A solution of 51.0 g. (0.33 mole) of 4-acetamidocyclohexanone and 36.0 g. (0.33 mole) of phenylhydrazine in 650 ml. of acetic acid was stirred and heated at 80°–90° for five hours. The acetic acid was distilled in vacuo and the residue stirred in water, collected and dried. Recrystallization from acetone-Skelly B gave 48.0 g. (65%) of product, M.P. 180°–181°.

Analysis.—Calcd. for $C_{14}H_{16}N_2O$ (percent): N, 12.27. Found (percent): N, 12.34.

(D) 3-amino-1,2,3,4-tetrahydrocarbazole.—A solution of 48.0 g. (0.21 mole) of 3-acetamido-1,2,3,4-tetrahydrocarbazole in 500 ml. of ethanol and 500 ml. of 50% aqueous KOH solution was stirred and heated under reflux for three days. The ethanol was distilled in vacuo and the brown solid which formed in the distillation pot was collected and washed with water; yield 36 g., M.P. 176°–184° (92%). The crude product was purified by formation of the cyclohexanesulfamic acid salt in acetone, M.P. 194°–196° (yield 67 g., 95%). A free base was regenerated using dilute $NH_4OH$ solution; yield 32 g. (94%), M.P. 188°–189°.

(E) 3-formylamino-1,2,3,4-tetrahydrocarbazole. — A solution of 30.0 g. (0.161 mole) of 3-amino-1,2,3,4-tetrahydrocarbazole in 200 ml. of formamide was heated on the steam bath for four hours. Upon cooling the product crystallized; yield 24.5 g. (66%), M.P. 154°–155°.

Analysis.—Calcd. for $C_{13}H_{14}N_2O$ (percent): N, 13.07. Found (percent): N, 12.92.

(F) 3 - methylamino-1,2,3,4-tetrahydrocarbazole-maleate.—A solution of 24.5 g. (0.115 mole) of 3-formylamino-1,2,3,4-tetrahydrocarbazole in 500 ml. of THF was added to a stirred suspension of 22 g. of $LiAlH_4$ in 700 ml. THF. The reaction mixture was stirred under reflux overnight. The excess hydride was decomposed by slow addition of $THF-H_2O$ (9:1) followed by dilute sodium hydroxide solution (25 ml.). The inorganic salts were filtered and the filtrate concentrated in vacuo. The residue was dissolved in 2-propanol, the solution clarified and treated with 15 g. of maleic acid in 2-propanol. On cooling the product crystallized; yield 27.5 g. (77%), M.P. 167°–168°.

Analysis.—Calcd. for $C_{17}H_{20}N_2O_4$ (percent): N(basic), 4.43; neut. equiv. 158. Found (percent): N(basic), 4.37; neut. equiv. 156.

Example 3.—3-ethylamino-1,2,3,4-tetrahydrocarbazole (A) 3-ethylamino-1,2,3,4-tetrahydrocarbazole.—A solution of 3-acetamido-1,2,3,4-tetrahydrocarbazole (6.29 g., 0.027 mole) in 50 ml. of THF was added to a stirred suspension of LiAlH$_4$ (5.12 g., 0.135 mole) in 100 ml. of THF. The mixture was stirred under reflux for 24 hours. The excess LiAlH$_4$ was destroyed in the usual manner, the inorganic salts were filtered, and the filtrate concentrated in vacuo. The residue was dissolved in 1500 ml. of dry ether, treated with Nuchar, filtered, and concentrated by boiling to one fourth its original volume. On cooling, 2 g. of pure free base was obtained which melted at 125°–126°.

*Analysis.*—Calcd. for C$_{14}$H$_{18}$N$_2$ (percent): C, 78.46; H, 8.47; N, 13.09. Found (percent): C, 77.50; H, 8.57; N, 12.96.

I.R. $\nu_{max.}^{CHCl_3}$ cm.$^{-1}$ 3470 (NH indole), no amide C=O absorption at 1670 cm.$^{-1}$.

Example 4.—3-methylamino-9-methyl-1,2,3,4-tetrahydrocarbazole (A) 4-formamidophenol.—A solution of p-aminophenol (10.9 g., 0.1 mole) in 25 ml. of 97% formic acid was refluxed for one hour. The formic acid was removed in vacuo and 100 ml. of H$_2$O was added. On cooling the product separated as a white powder. Yield 10.7 g., M.P. 138°–139°.

(B) 4-formamidocyclohexanol.—A 210 g. sample of 4-formamidophenol was hydrogenated in an autoclave using methanol as solvent and RuO$_2$ as catalyst (1500 p.s.i., 150°). The hydrogenation required 2 days for a 3 mole-equivalent uptake. The catalyst was removed by filtration and the methanol distilled in vacuo. Distillation of the residual oil through a short Vigreaux column gave 137 g. of product, B.P. 170°–175° (1.0 mm.).

(C) 4-formamidocyclohexanone.—To a cold stirred solution of Na$_2$Cr$_2$O$_7$·2H$_2$O (238.4 g., 0.8 mole) and H$_2$SO$_4$ (78.4 g., 0.8 mole) in 200 ml. of H$_2$O was added dropwise in an aqueous solution of 4-formamidocyclohexanol (57.2 g., 0.4 mole). The solution was stirred in the cold for 1.5 hours, then extracted continuously with CHCl$_3$ for two days. The CHCl$_3$ extract was dried over K$_2$CO$_3$, filtered and concentrated in vacuo. The residue was distilled under reduced pressure to yield 24.9 g. of product, B.P. 145°–170°/0.2 mm.

I.R. $\nu_{max.}^{CHCl_3}$ cm.$^{-1}$ 3445 amide NH; 3325 amide NH; 1720 C=O (ketone); 1670 C=O (amide).

(D) 3-formamido-9-methyl-1,2,3,4-tetrahydrocarbazole.—A mixture of 4-formamidocyclohexanone (10.7 g., 0.07 mole), 1-methyl-1-phenylhydrazine (9.3 g., 0.076 mole), p-toluenesulfonic acid (catalytic amount) and 200 ml. of dry benzene were heated under reflux for ten hours. The H$_2$O formed was collected in a Dean-Starke trap. The solution was removed in vacuo. Yield, 17 g. of dark viscous oil.

I.R. $\nu_{max.}^{CHCl_3}$ cm.$^{-1}$ 1685 C=O (amide); complete removal of C=O (ketone) at 1710; 1600 and 1500 (strong aromatic absorption); 3445 NH (amide); 3310 (N—H).

A 10 g. sample of the hydrazone was heated for five hours in acetic acid. The solvent was removed in vacuo, the residue dissolved in CHCl$_3$, washed with Na$_2$CO$_3$ solution, dried over MgSO$_4$ and concentrated in vacuo. The residue was dissolved in benzene and poured in a Florisil column. The tetrahydrocarbazole was eluted with ethyl acetate; yield 9.4 g. The compound was recrystallized from acetone-pentane, M.P. 219°–220°.

*Analysis.*—Calcd. for C$_{14}$H$_{15}$N$_2$O (percent): N, 12.32. Found (percent): N, 12.40.

(E) 3-methylamino-9-methyl-1,2,3,4-tetrahydrocarbazole maleate.—A solution of 3-formamido-9-methyl-1,2,3,4-tetrahydrocarbazole (9.4 g., 0.041 mole) in THF was added to a stirred suspension of LiAlH$_4$ (7.96 g., 0.21 mole in 100 ml. of THF. The mixture was then stirred under reflux overnight. The excess hydride was destroyed in the usual manner, the inorganic salts were filtered and the filtrate concentrated in vacuo. The maleate was prepared in acetone solution and precipitated by addition of dry ether. The salt was recrystallized from acetone-ether to yield 2.2 g. of product, M.P. 193°–194°.

*Analysis.*—Calcd. for C$_{14}$H$_{18}$N$_2$·C$_4$H$_4$O$_4$ (percent): C, 65.39; H, 6.71; N, 8.48. Found (percent): C, 65.36; H, 6.86; N, 8.44.

Example 5.—3-(2-propyl)amino-1,2,3,4-tetrahydrocarbazole (A) 3-(2-propyl)amino-1,2,3,4-tetrahydrocarbazole.—A 10 g. sample of 3-amino-1,2,3,4-tetrahydrocarbazole was refluxed in 300 ml. of acetone for twenty-four hours. The solvent was removed in vacuo. The infrared spectrum showed a band at 1675 cm.$^{-1}$ (C=N). The residue was dissolved in ethanol and hydrogenated in the Parr shaker (50 p.s.i.) using platinum catalyst. The theoretical quantity of hydrogen was absorbed in three hours. An infrared spectrum of the residue from evaporation of the ethanol solution showed complete removal of the band at 1675 cm.$^{-1}$. The free based solidified when stirred with ether.

(B) 3-(2-propyl)amino-1,2,3,4-tetrahydrocarbazole maleate.—The free base was dissolved in acetone and treated with a slight excess of maleic acid. Addition of ethyl acetate and ether caused precipitation of the salt which was recrystallized from an isopropyl alcohol-ethyl acetate-ether mixture to give 5.6 g. of product, M.P. 188°–189°.

*Analysis.*—Calcd. for C$_{19}$H$_{24}$N$_2$O$_4$ (percent): N(basic), 4.07; N(total) 8.14. Found (percent): N(basic), 4.05; N(total), 8.29.

Example 6.—3-methylamino-6-methoxy-1,2,3,4-tetrahydrocarbazole (A) 3-amino-6-methoxy-1,2,3,4-tetrahydrocarbazole.—A solution of p-methoxyphenylhydrazine (19.9 g., 0.14 mole) and 4-acetamidocyclohexanone (22.4 g., 0.14 mole) in 400 ml. of dry benzene was heated under reflux while the water liberated was collected in a Dean-Starke trap. The benzene was distilled in vacuo and the residue dissolved in glacial acetic acid. The solution was heated at 90° for three hours. The acetic acid was distilled in vacuo and the residual material was dissolved in 200 ml. of methanol and 500 ml. of 50% KOH solution. The mixture was stirred under reflux for five days. The solution was acidified with concentrated HCl and shaken with CHCl$_3$. The aqueous layer was treated with excess K$_2$CO$_3$ then extracted with CHCl$_3$. Drying and concentration of the extract in vacuo gave 26 g. of solid material from which a small analytical sample was prepared by recrystallization from benzene, M.P. 131°–131.5°.

*Analysis.*—Calcd. for C$_{13}$H$_{16}$N$_2$O (percent): N(basic), 6.47; N(total), 12.95. Found (percent): N(basic), 6.51; N(total), 12.77.

(B) 3-formamido-6-methoxy-1,2,3,4-tetrahydrocarbazole.—3-amino-6-methoxy-1,2,3,4-tetrahydrocarbazole (16 g.) was mixed with 100 ml. of formamide and refluxed for three hours. The dark solution was poured on crushed ice and the organic material was extracted with CHCl$_3$. The extract was dried over MgSO$_4$, filtered and concentrated in vacuo. The residue which was a dark glass was redissolved in CHCl$_3$, washed with aqueous oxalic acid, Na$_2$CO$_3$ solution and water. The CHCl$_3$ extract was then dried, stirred with charcoal for ten minutes and filtered. The solvent was removed in vacuo. Yield 14 g.

$\nu_{max.}^{CHCl_3}$ cm.$^{-1}$ — 3450 (NH); 1675 (C=O) amide.

(C) 3-methylamino - 6 - methoxy - 1,2,3,4-tetrahydrocarbazole hemisuccinate.—To a stirred suspension of LiAlH$_4$ (11.4 g., 0.3 mole) in dry THF (200 ml.) was added dropwise a solution of 3-formamido-6-methoxy-1,2,3,4 - tetrahydrocarbazole (14 g., 0.057 mole) in dry THF (50 ml.) The mixture was refluxed with stirring for three days. The excess LiAlH$_4$ was destroyed with dilute THF (10%), NaOH (20%), and H$_2$O. The inorganic salts were collected by filtration and washed several times with boiling THF. The filtrate was concentrated to dryness in vacuo. The residue amounted to 12 g.

$\nu_{max.}^{CHCl_3}$ complete removal of the band at 1675 cm.$^{-1}$ (amide). The crude amine was converted to the hemisuccinate in ethanol and was precipitated by addition of ethylacetate. After several recrystallizations from H$_2$O, 0.7 g. of pure salt was obtained; M.P. 231°–232°.

*Analysis.*—Calcd. for C$_{14}$H$_{18}$N$_2$O·½ (CH$_2$CO$_2$H)$_2$ (percent): N(basic), 4.84. Found (percent): N(basic), 4.79.

Example 7.—3-(N-methyl-N-propargylamino)-1,2,3,4-tetrahydrocarbazole

A mixture of 3-methylamino-1,2,3,4-tetrahydrocarbazole (22.3 g., 0.11 mole), propargyl bromide (13.1 g., 0.11 mole), Na$_2$CO$_3$ (40 g.) and 800 ml. of 2-propanol was refluxed with stirring for twelve hours. The dark solution was filtered and the filtrate was concentrated to dryness in vacuo. The dark residue was extracted several times with boiling n-heptane. The extracts were combined, treated with charcoal, filtered hot and concentrated to about 250 ml. On cooling in an ice bath a white crystalline solid was obtained. The solid was collected by filtration and recrystallized twice from ethanol —H$_2$O. Yield 3 g., M.P. 118°–119°.

*Analysis.*—Calcd. for C$_{16}$H$_{18}$N$_2$ (percent): N(basic), 5.88; C, 80.64; H, 7.62; N(total), 11.75.

Found (percent): N(basic), 5.86; C, 80.53; H, 7.72; N(total), 11.38.

$\nu_{max.}^{CHCl_3}$ 3475 cm.$^{-1}$ (NH) indole; 3300 cm.$^{-1}$ (acetylenic C—H).

Using the process of this example, the following compounds can be produced from the 3-(secondary amino)-1,2,3,4-tetrahydrocarbazoles listed below:

| Starting material | Compound |
|---|---|
| 3-ethylamino-1,2,3,4-tetrahydrocarbazole. | 3-(N-ethyl-N-propargylamino)-1,2,3,4-tetrahydrocarbazole. |
| 3-methylamino-9-methyl-1,2,3,4-tetrahydrocarbazole. | 3-(N-methyl-N-propargylamino)-9-methyl-1,2,3,4-tetrahydrocarbazole. |
| 3-(2-propyl) amino-1,2,3,4-tetrahydrocarbazole. | 3-[N-(2-propyl)-N-propargylamino] 1,2,3,4-tetrahydrocarbazole. |
| 3-methylamino-6-methoxy-1,2,3,4-tetrahydrocarbazole. | 3-(N-methyl-N-propargylamino)-6-methoxy-1,2,3,4-tetrahydrocarbazole. |

In summary this invention relates to a series of 3-substituted amino - 1,2,3,4 - tetrahydrocarbazoles as represented by the generic formula given above which have utility as analgetic agents.

What is claimed is:

1. A compound selected from the group consisting of compounds of the formula:

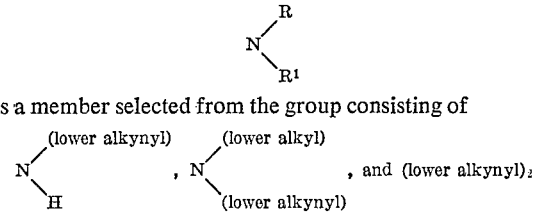

in which

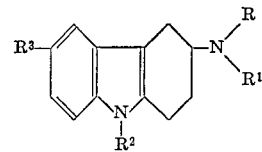

is a member selected from the group consisting of

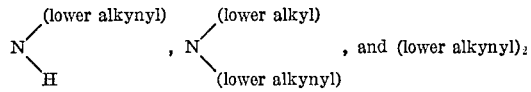

R$^2$ is a member selected from the group consisting of H and lower alkyl and R$^3$ is a member selected from the group consisting of H, OH and lower alkoxy, and acid addition salts thereof.

2. A compound according to claim 1 which is 3-(N-methyl-N-proparglyamine) - 1,2,3,4 - tetrahydrocarbazole.

References Cited

Dressler et al.: Chem. Abstracts, vol. 57:5872a (1962).

HENRY R. JILES, Primary Examiner

S. D. WINTERS, Assistant Examiner

U.S. Cl. X.R.

260—569, 563, 566; 424—274